United States Patent [19]

Bailes

[11] 4,351,720
[45] Sep. 28, 1982

[54] WATER TREATING APPARATUS

[76] Inventor: Clyde E. Bailes, Box 512, Summersville, W. Va. 26651

[21] Appl. No.: 274,924

[22] Filed: Jun. 18, 1981

[51] Int. Cl.³ .............................................. C02F 1/66
[52] U.S. Cl. .................................. 210/101; 210/127; 210/128; 210/154; 210/205
[58] Field of Search ................ 137/268; 210/744, 101, 210/104, 105, 126–128, 154, 205–207; 222/57, 64, 67

[56] References Cited

U.S. PATENT DOCUMENTS

| | | | |
|---|---|---|---|
| 292,046 | 1/1884 | Powers | 210/127 |
| 1,225,978 | 5/1917 | Ledoux | 222/57 X |
| 1,496,678 | 6/1924 | Rutter | 210/170 X |
| 1,536,054 | 5/1925 | Bartlett | 222/57 X |
| 1,943,684 | 1/1934 | Martin et al. | 210/96.1 X |
| 2,057,208 | 10/1936 | Runcie | 210/105 |
| 2,278,723 | 4/1942 | Malsbary et al. | 210/105 X |
| 2,546,317 | 3/1951 | Prizer | 210/101 X |
| 2,564,543 | 8/1951 | Moore | 210/188 |
| 2,748,076 | 5/1956 | Bohannon | 222/57 X |
| 2,772,779 | 12/1956 | Norris | 210/96.1 X |
| 2,988,221 | 6/1961 | Culp | 210/104 |
| 3,181,731 | 5/1965 | Ellis | 222/57 |
| 3,883,429 | 5/1975 | Hanford | 210/104 |
| 4,093,551 | 6/1978 | Paabo et al. | 210/207 X |
| 4,094,786 | 6/1978 | Bury | 210/101 |
| 4,116,834 | 9/1978 | King | 210/96.1 |

Primary Examiner—Robert H. Spitzer
Attorney, Agent, or Firm—Sughrue, Mion, Zinn, Macpeak & Seas

[57] ABSTRACT

An apparatus for treating water or other liquid comprises outwardly extending front side walls defining an entrance for water to be treated, intermediate inwardly extending side walls, central parallel side walls and outwardly extending rear walls defining an exit for treated water or other liquid. A stepped bottom is integral with and between the side walls. A housing, slidable on the top edges of the side walls, is provided for holding a chemical solution to be dispensed into the water to be treated. A float housing integral with one of the intermediate side walls contains a float which is raised or lowered according to the volume of water flowing between the side walls. A valve on the housing is interconnected with the float whereby the solution within the housing is dispensed into the water or liquid to be treated in proportion to the volume of water flowing between the side walls. A chemical solution is fed from a bulk storage container to the housing through a float valve which insures that the housing will always contain an adequate supply of chemicals.

12 Claims, 4 Drawing Figures

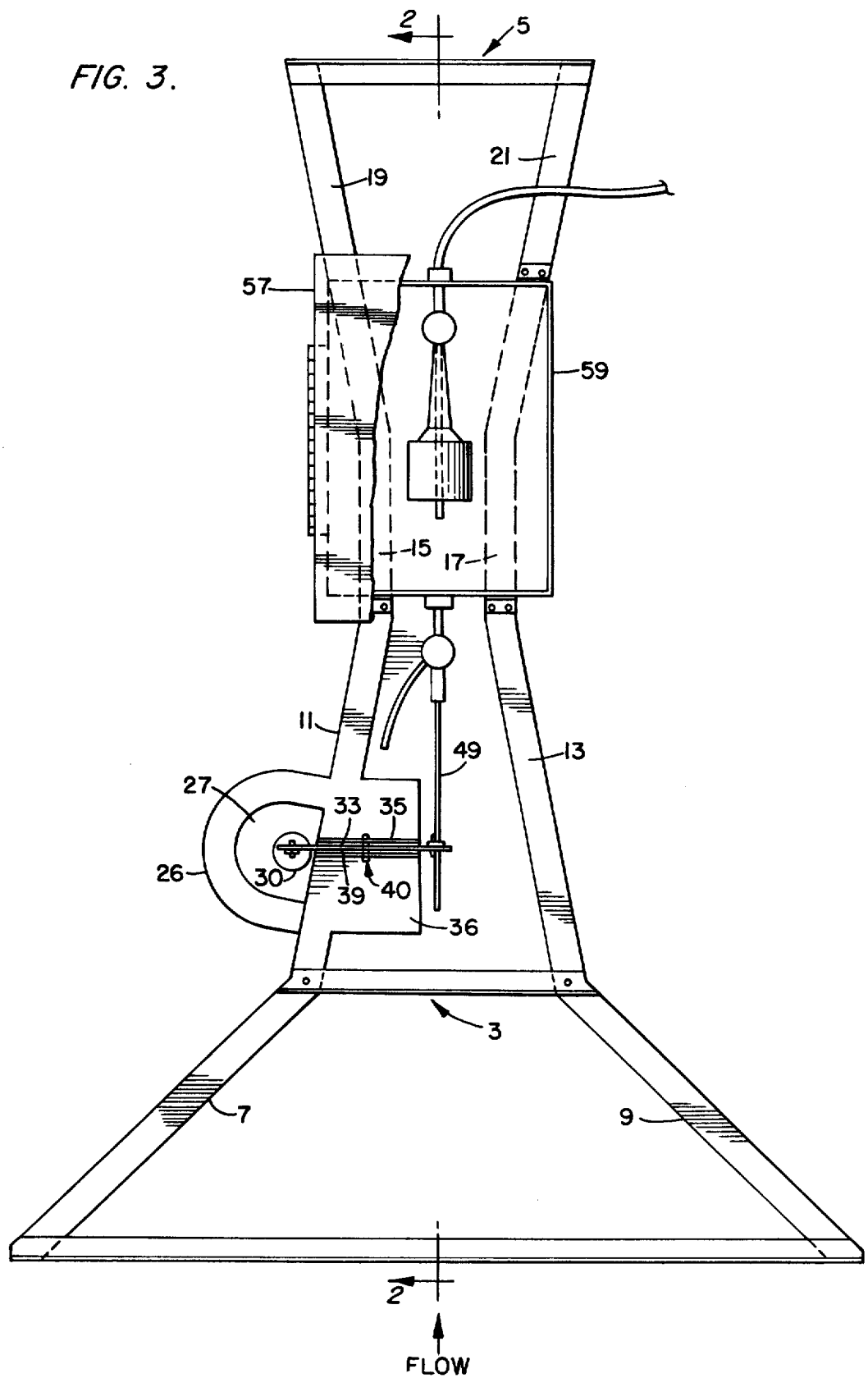

WATER TREATING APPARATUS

BACKGROUND OF THE INVENTION

1. Field of the Invention

This invention pertains to a portable apparatus for feeding chemicals into a stream of water or other liquid to be treated. The apparatus is placed into a stream whereby the water passes through the device and the chemicals are dispensed into the water through a valve which is controlled by a float responding to the volume of water passing through the apparatus.

2. Statement of the Prior Art

The prior art discloses apparatus for treating sewage, the hydrogen-ion concentration of solutions and salt or hard water using permanently installed structures utilizing pumps, troughs, and filters. Unlike the prior art, the present invention is portable and is inserted into a stream of polluted water or other liquid which flows through the device and is treated with a chemical solution dispensed according to the rate or volume of water passing through the apparatus. Representative of the prior art are those listed below.

| Patentee | Patent No. | Issue Date |
| --- | --- | --- |
| W. A. Rutter | 1,496,678 | June 3, 1924 |
| H. S. Martin et al | 1,943,684 | Jan. 16, 1934 |
| W. T. Runcie | 2,057,208 | Oct. 13, 1936 |
| R. P. Moore | 2,564,543 | Aug. 14, 1951 |
| D. E. Norris | 2,772,779 | Dec. 4, 1956 |
| King | 4,116,834 | Sep. 26, 1978 |

SUMMARY OF THE INVENTION

This invention is adapted to be placed into a stream of water or other liquid to be treated and will automatically dispense a chemical solution into the water or liquid as it passes through the apparatus.

It is one object of this invention to provide a portable apparatus which is simple and inexpensive to construct and readily installed in a stream of water or other liquid to be treated.

It is another object of this invention to provide a slidable chemical storage and dispensing housing positioned above the apparatus from which a chemical solution is automatically dispensed into a stream of water or liquid to be treated. The housing has a lid so as to provide access thereto for adjusting valving and for cleaning.

It is still another object of this invention to provide an apparatus having a chemical storage housing which is automatically replenished with a chemical solution from a bulk storage container remote from the apparatus.

It is yet another object of this invention to provide an apparatus insertable into a stream of water or other liquid to be treated having valving operable in response to the flow of water or liquid to dispense a chemical solution from the housing into the water or liquid to be treated.

These and other features of the invention will become apparent from a consideration of the specification when read in conjunction with the annexed drawings.

BRIEF DESCRIPTION OF THE DRAWINGS

FIG. 3 is a plan view of the apparatus showing the chemical storage housing, and float valve therein, dispensing valve operator and a float within a float housing connected to the valve operator to open and close the dispensing valve.

DESCRIPTION OF THE PREFERRED EMBODIMENT

Figure 1:
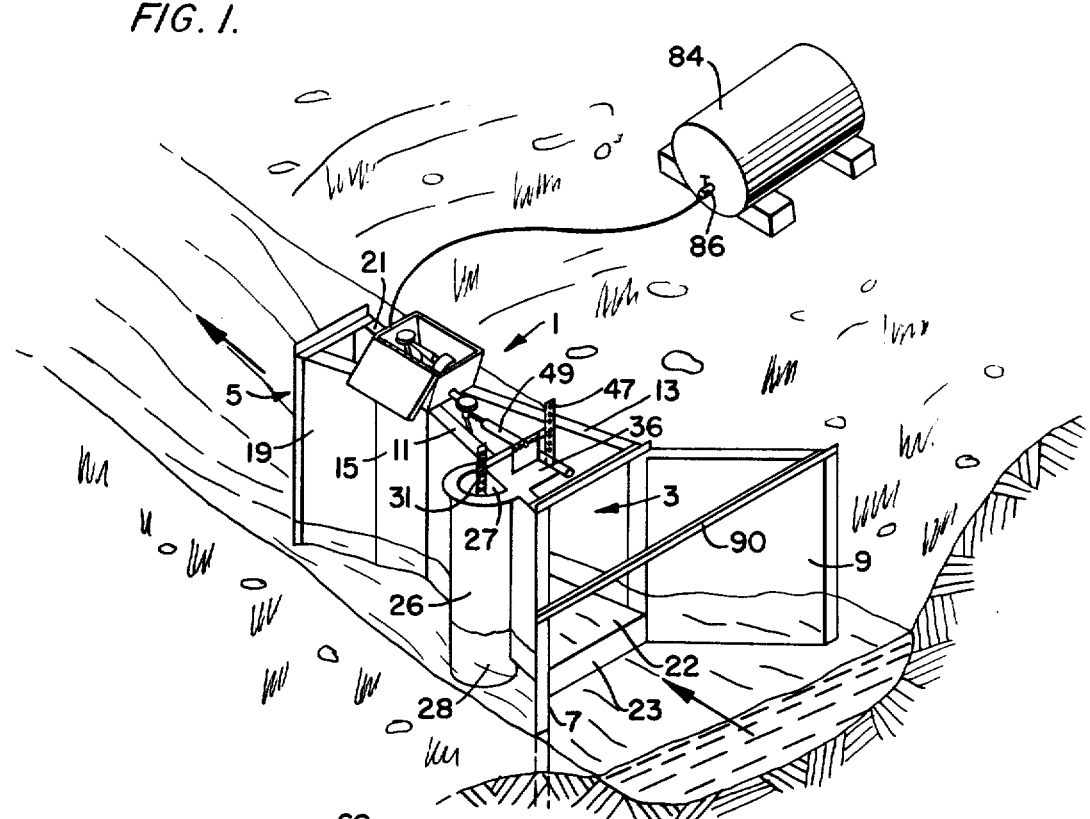
FIG. 1 is a perspective view of the apparatus showing a stream of water or other liquid flowing through the device, a chemical bulk storage container connected to a solution storage housing on top of the apparatus and valving operably connected to a float whereby the chemical solution is fed into the water or liquid to be treated.
Figure 4:
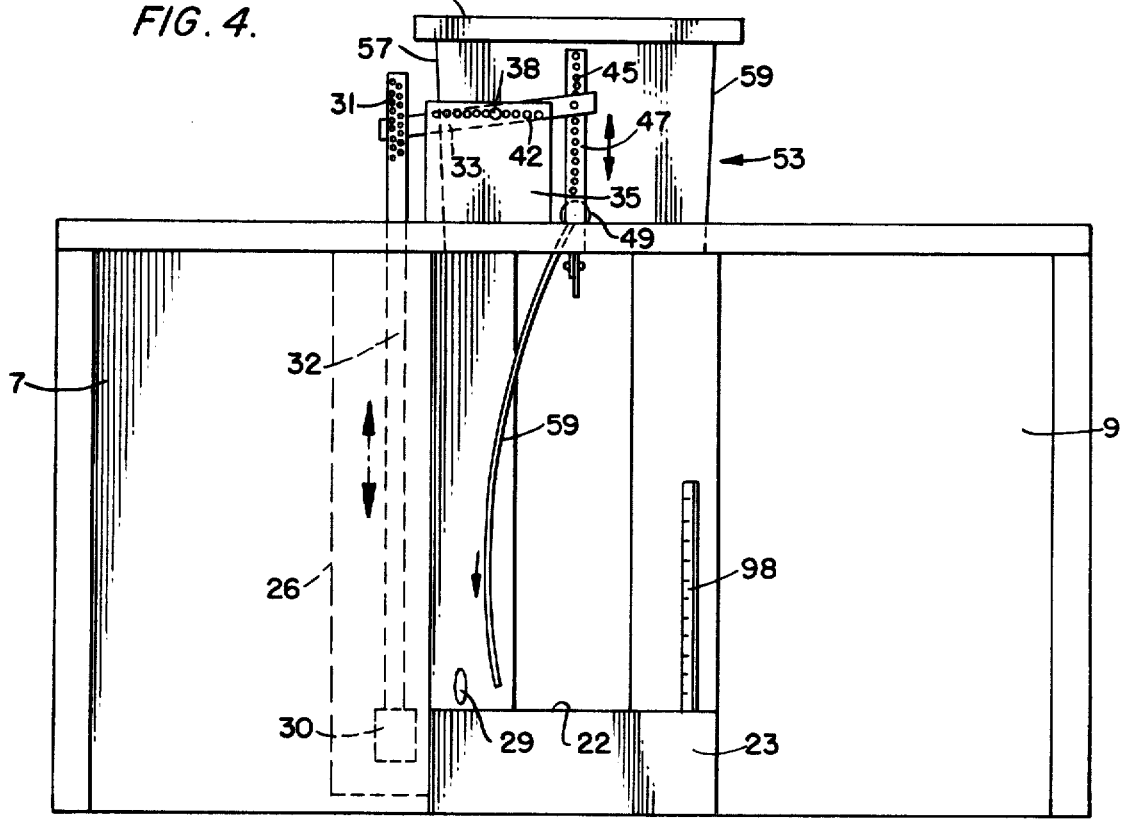
FIG. 4 is a cutaway front view showing a dispensing tube extending from the dispensing valve attached to the chemical storage housing, and a float connected by an assembly of rods and bars to a valve operator whereby the dispensing valve is progressively opened upon raising of the valve in response to the flow of water or liquid through the apparatus.
Figure 2:
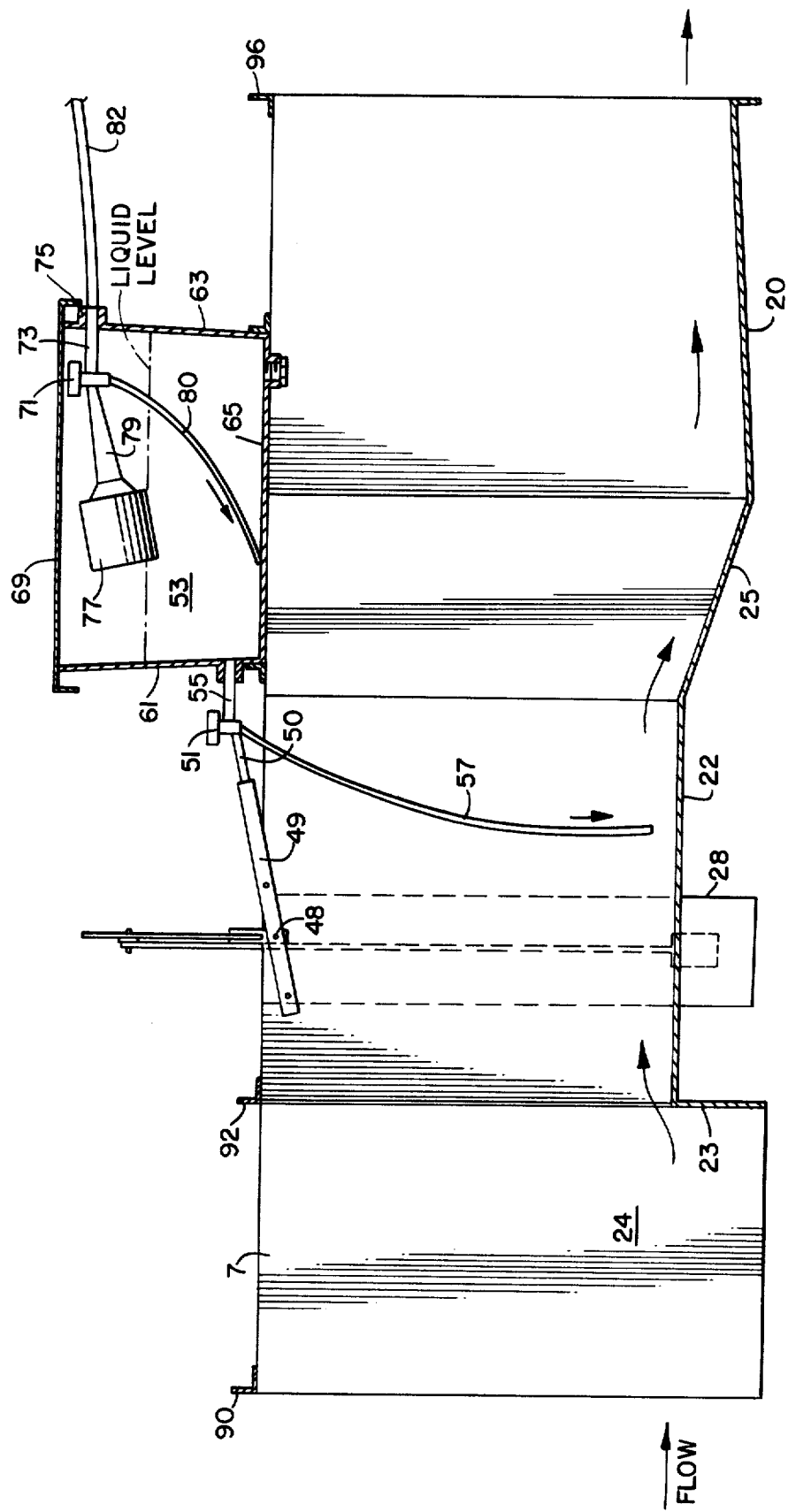
FIG. 2 is a cutaway side view showing the chemical storage housing, a float valve therein for controlling the flow of chemicals from a bulk storage container, chemical dispensing valving and feeder tube, valve operators and a float within a float housing operable to raise or lower the dispensing valve operator to open or close the dispensing valve.

The water or liquid treating apparatus 1 is shown to have an inlet 3 and an outlet 5 wherein water or other liquid to be treated may enter and exit the device. The apparatus 1 has outwardly extending front side walls 7 and 9 which form a large opening for water to enter the apparatus. Intermediate side walls 11 and 13 extend inwardly from the front side walls 7 and 9 in a generally V-shaped configuration. Center side walls 15 and 17 extend from the intermediate side walls 11 and 13 and extend generally parallel with each other for distance and then extend outwardly away from each other to form rear side walls 19 and 21. A bottom wall 22 extends between the side walls from front to rear of the apparatus. The bottom wall 22 has a downwardly projecting flange 23 which, together with the front side walls 7 and 9, forms a well 24 for water or liquid. The bottom 22 extends horizontally between the intermediate side walls 7 and 9, slants downwardly at 25 between the center side walls 15 and 17 and then extends horizontally at 20 between the rear side walls 19 and 21.

The area between the center side walls 15 and 17 and the downward slanted bottom define a venturi whereby the water or liquid accelerates thus creating turbulence so that the chemical solution mixes thoroughly with the water or liquid.

A float housing 26 is integral with intermediate side wall 11 and is generally U-shaped in configuration, open at the top 27 and extending below the bottom 22 at 28. The float housing 26 has an opening 29 near the bottom 22 so that water may enter therein.

A float 30 is attached to a support rod 32 which extends upwardly through the opening 27. The end of the rod 32 has a series of apertures 31 used to permit selective attachment to a horizontal bar 33. The bar 33 is pivotably supported within a slot in the top of a vertical panel 35. The bottom of the panel is fastened to a horizontal flange 36 extending inwardly of the side wall 11. The panel 35 has a pair of apertures 38 (one shown) extending therethrough and opposite each other. The bar 33 is positioned within the slot 39 and selectively pivotably supported therein by a pin 40 which extends through one of a series of apertures 42 in the bar and the apertures 38 in the panel.

By this construction, the float 30 is free to move upwardly or downwardly depending upon the volume of water or liquid entering the apparatus. Upward or downward movement of the float translates to the bar 33 which pivots on pivot pin 40 and operates a float operator to be presently explained.

The bar 33 is selectively attached to one of a series of apertures 45 in a vertical bar 47. The lower end of the bar 47 is selectively secured to one of several apertures 48 in a valve operator 49 by any suitable pin. The inner end 50 of the valve operator 49 is attached to and operates a valve 51 for dispensing a chemical solution. The valve 51 is connected to a chemical solution housing 53 by a tube 55 and a length of flexible tubing 57 extends from the valve to a location near the bottom wall 22.

The solution housing 53 has side walls 57 and 59, end walls 61 and 63, bottom wall 65 and a hinged lid 69. A valve 71 is attached to the end wall 63 by a tube 73 and a suitable fitting 75. A float 77 is attached to one end of a valve operator 79, the opposite end of which is attached to the valve 71 for operating same. A length of flexible tube 80 extends from valve 71 to a location near or resting on the bottom wall 65 of the housing 53. A supply line 82 extends from a bulk supply container 84 through a hand operable valve 86 and is connected to the inlet tube 73 of valve 71.

Solution from the bulk storage container 84 is feed automatically to the housing 53 by the valve 71 as solution is dispensed into the water or liquid to be treated.

The housing 53 is slidably attached to the top edges of the apparatus by any suitable runners (not shown). This construction permits the housing to slide back and forth on the top edges of the apparatus so as to permit calibration of the valve 51 through the adjustable connecting linkage rods 32, 33, 47 and value operator 49. Proper calibration through selective adjustments of these rods, bars and valve operator is necessary to achieve optimum dispensing of the chemical solution according to the flow of water or liquid through the apparatus.

A measuring device 98 is secured to the inside of one of the intermediate side walls to measure the volume of water or liquid flowing through the device. Braces 90, 92 and 96 are provided to lend stability and strength to the apparatus.

In operation, the water or liquid treating device 1 is placed into a stream of water or other liquid to be treated with the front wall 7 and 9 facing the direction of flow. Water or liquid enters opening 3 and flows along bottom walls 22, 25 and 20 and between the side walls. Water or liquid enters aperture 29 into the float housing 26 whereby the float 30 rises in response to the rising of the water or liquid. When the float 30 rises within housing 26, bar 33 pivots on pivot pin 40 forcing bar 47 downwardly whereby the valve 51 is progressively opened dispensing a chemical solution from the housing 53 into the water or liquid to be treated. Conversely, when the water flow and volume decreases through the apparatus, the float 30 descends within the housing 26 whereby the bar 33 is pivoted raising the bar 47 thus progressively closing the valve 51. Thus, by selectively changing the location of the pivot points of the bar 33 with respect to the rod 32 and the bar 47, optimum calibration of the valve 51 is achieved.

While the invention has been particularly shown and described with reference to a preferred embodiment thereof, it will be understood by those skilled in the art that various changes in the form and details may be made therein without departing from the spirit and scope of the invention.

What I claim is:
1. A water treating apparatus comprising:
   front side walls;
   intermediate side walls;
   central side walls;
   rear side walls;
   a bottom wall between said side walls;
   a float housing on one of said intermediate side walls;
   a float supported on a vertically movable rod within said float housing;
   a chemical solution holding housing on top of said walls;
   a valve exterior of said chemical solution holding housing and communicating with the interior thereof;
   means supported on support means and interconnected with said float and said valve operable in response to upward or downward movement of said float to open or close said valve in response to water or liquid flow through said apparatus;
   a valve within said chemical solution holding housing; and
   a bulk storage container connected to said valve within said chemical solution holding housing whereby said container is replenished with a chemical solution.

2. A water treating apparatus as defined in claim 1, wherein:
   said bottom wall is stepped from a higher elevation to a lower elevation and said walls therebetween are parallel thus defining a venturi whereby water or liquid having treating chemicals therein is accelerated causing turbulence which results in thorough mixing of the chemical solution and water or liquid.

3. A water treating apparatus as defined in claim 1, wherein:
   said side walls are integral and said float housing integral with one of said intermediate side walls.

4. A water treating apparatus as defined in claim 1, wherein:
   said solution holding housing has means for permitting adjustment of said interconnecting means for the purpose of calibrating said valve exterior of said chemical solution holding housing.

5. A water treating apparatus as defined in claim 1, wherein:
   said support means comprises, a flange extending inwardly of one of said intermediate side walls adjacent the upper edge thereof and a vertical panel having a slot in the upper edge thereof supported on said flange.

6. A water treating apparatus as defined in claim 1, wherein:
   said means interconnecting said float and said valve comprises a bar selectively pivotably supported on said support means and selectively pivotably attached to a valve operator.

7. A water treating apparatus as defined in claim 6, wherein:
   said bar is attached to said float at one end and attached to a valve operator at the opposite end whereby when said float is raised or lowered in response to water flow through said apparatus, said valve operator is raised or lowered accordingly to progressively open or close said valve thus controlling the dispensing of a chemical treating solution into the water or liquid.

8. A water treating apparatus as defined in claim 1, wherein:
said chemical solution is dispensed into the water or liquid in the elevated portion of the bottom wall by a flexible tube extending from said valve to a position near said elevated bottom wall.

9. A water treating apparatus as defined in claim 1, wherein:
said solution housing is replenished with a chemical solution through a valve therein connected to a bulk storage container.

10. A water treating apparatus as defined in claim 1, wherein:
said front walls extend outwardly defining a wide entrance for water or liquid, said intermediate side walls extend inwardly from said front walls, said center side walls extend from said intermediate side walls and parallel for a distance, and said rear walls extend outwardly from said center parallel side walls and define a wide exit for treated water or liquid.

11. A water treating apparatus as defined in claim 1, wherein:
said valve exterior of said housing is calibrated by selectively adjusting the pivot points connecting the valve operator and the float support rod.

12. A water treating apparatus as defined in claim 1, and:
means between said intermediate side walls for measuring the volume of water flowing through said apparatus.

* * * * *